United States Patent [19]

Ridgwell

[11] Patent Number: 4,712,750
[45] Date of Patent: Dec. 15, 1987

[54] TEMPERATURE CONTROL DEVICE FOR JET ENGINE NACELLE ASSOCIATED STRUCTURE

[75] Inventor: Robert H. Ridgwell, Kirkland, Wash.
[73] Assignee: The Boeing Company, Seattle, Wash.
[21] Appl. No.: 859,015
[22] Filed: May 2, 1986
[51] Int. Cl.$^4$ .............................. B64D 33/04
[52] U.S. Cl. .................. 244/117 A; 244/54; 244/121
[58] Field of Search .............. 244/53 R, 54, 117 A, 244/158 A, 121

[56] References Cited

U.S. PATENT DOCUMENTS 3,833,187 9/1974 Kahler et al. .................. 244/54
4,238,092 12/1980 Brennan ........................ 244/54
4,466,587 8/1984 Dasa et al. .................... 244/53 R Primary Examiner—Jeffrey V. Nase
Assistant Examiner—Rodney Corl
Attorney, Agent, or Firm—Christensen, O'Connor, Johnson & Kindness

[57] ABSTRACT

A temperature control device for a jet aircraft engine installation that includes a jet engine and a nacelle for supporting and enclosing the jet engine. The jet engine has a primary exhaust nozzle from which the engine produces a rearwardly extending primary exhaust plume of hot gases. The primary exhaust plume has a centerline and a generally cylindrical shape about its centerline. Each engine installation includes a nacelle-associated structure, such as a support strut, that extends in a generally fore and aft direction above the centerline of the primary exhaust plume. The temperature control device comprises a deflector formed at the lowermost surface of the nacelle-associated structure. The deflector includes a sheet-like lower surface having a lateral extent greater than the lateral extent of the nacelle-associated structure immediately above the deflector, and extends longitudinally aft of the primary exhaust nozzle. The deflector is positioned such that its lower surface is generally parallel to the primary exhaust plume.

7 Claims, 6 Drawing Figures

TEMPERATURE CONTROL DEVICE FOR JET ENGINE NACELLE ASSOCIATED STRUCTURE

FIELD OF THE INVENTION

The present invention relates to jet aircraft nacelles and, in particular, to a temperature control device for a nacelle-associated structure.

BACKGROUND OF THE INVENTION

FIG. 1 illustrates a modern, twin engine jet aircraft of known design and FIG. 2 the engine installation for such an aircraft. The aircraft comprises fuselage 10, wings 12 and 14, and essentially identical engine installations 16 and 18 supported by wings 12 and 14 respectively. Engine installation 16 comprises nacelle 20 within which a high bypass turbofan engine is mounted. Such an engine includes a turbine casing housing a high-pressure compressor, a burner, and a turbine. The turbine is connected to a central shaft running along the centerline of the engine, and the central shaft in turn drives the high-pressure compressor. A large diameter, high bypass annular fan is mounted near the forward end of nacelle 20, and is driven from the turbine shaft. The engine utilizes some of the air passing through inlet 22 to burn jet aircraft fuel in the turbine engine, to produce primary exhaust plume 24 of hot gases from primary exhaust nozzle 26. The fan expels the remainder of the air introduced via inlet 22 through fan discharge duct 28 as fan flow 30. Typical temperatures for primary exhaust plume 24 are 700°-800° F. Typical temperatures for fan flow 30 are 90°-120° F. Both primary exhaust plume 24 and fan flow 30 have generally cylindrical shapes about centerline 25.

The diameter of nacelle 20 of a high bypass, tubofan engine is significantly larger than the diameter of the nacelle of a low bypass tubofan engine or of the turbine casing of a turbo jet engine. FIG. 2 illustrates the comparatively small clearance 21 between ground line 23 and the lower surface of nacelle 20. To provide adequate ground clearance, it is necessary to position the nacelles of engine installations 16 and 18 closely under the respective wings. Nacelle 20 and the jet engine contained within the nacelle are supported from wing 12 by strut 32. The rearward portions of strut 32 are enclosed by aft fairing panels 34 and 36, and aft wedge panel 38, it being understood that similar aft fairing panels 34 and 36 are also disposed on the opposite side (as viewed in FIG. 2) of strut 32. The lower edges of aft fairing panels 34 and 36, and the aft fairing panels on the opposite side of strut 32, terminate in lower pan assembly 40 that extends rearwardly from the vicinity of primary exhaust nozzle 26 along the lower edges of the aft fairing panels. Aft fairing panel 34 therefore extends in a generally vertical direction between wing 12 and lower pan assembly 40. Flap track fairing 42 is secured to wing 12 directly behind strut 32, and encloses actuators for the flaps and other control devices on wing 12. Aft fairing panel 36 extends downward from flap track fairing 42 to lower pan assembly 40. Lower pan assembly 40 is divided lengthwise at joints 44-47 into five sections, to permit thermal growth of the lower pan assembly without buckling or deformation.

Further details of aft fairing panel 36, lower pan assembly 40 and related structures are shown in FIG. 3. Aft fairing panels 36 are joined to flap track fairing 42 by steel skate angles 50. In the embodiment illustrated in FIG. 3, each aft fairing panel is fabricated from steel. To reduce weight, the center portions of the steel fairing panels are chemically milled, to produce panels that have comparatively thin center sections and comparatively thick upper end portions 52 and lower end portions 54. Upper end portions 52 are used to join the aft fairing panels to skate angles 50. The lower ends of the aft fairing panels are joined at lower end portions 54 to web 56 that extends between the aft fairing panels. Secured between each aft fairing panel and web 56 is a splice strap 58 extends beneath the web, the splice straps being used for mounting lower pan 60, lower pan 60 being one segment of lower pan assembly 40 of FIG. 2.

In the initial embodiment of the engine installation shown in FIGS. 1-3, skate angles 50 were fabricated from steel, fairing panels 36 were fabricated from aluminum honeycomb, web 56 was fabricated from steel, and lower pan assembly 40 was fabricated from a nickel-steel alloy such as Inconel 625 alloy that has a very low coefficient of thermal expansion. However, it was soon discovered that such an installation resulted in severe thermal effects in aft fairing panels 36, flap track fairing 42 and related structures. The cause of such effects was believed to be the expansion of primary exhaust plume 24 during engine cutback. In particular, when the engine within nacelle 20 is throttled back, such as during descent, fan flow 30 is significantly reduced, and as a result, primary exhaust plume 24 expands and washes over the lower portions of the aft fairing panels and, in particular, after fairing panel 36. The result of such flow was the production of thermal stresses that produced buckling of aft fairing panels 36, and cracking of pan assembly 40, splice straps 58 and skate angles 50. The initial response to this problem was to change aft fairing panels 36 from aluminum honeycomb construction to the steel construction illustrated in FIG. 3. However, it was soon discovered that this solution delayed manifestation of the cracking problems, but did not ultimately prevent cracking and buckling. The only obvious solution was to provide steel internal supports within the area enclosed by the aft fairing panels, in an effort to prevent the buckling and cracking. However, it was recognized that this would be an extremely heavy and expensive solution to the problem.

SUMMARY OF THE INVENTION

The present invention is based upon the discovery that the undesirable thermal effects in the aft fairing panels and related structures of engine installations 16 and 18 could be essentially entirely eliminated by mounting a small, lightweight deflector at the lower edge of the lower pan assembly, and the associated discovery that such a deflector did not degrade the performance of the jet engine during climb, cruise or descent. The provision of such a deflector not only eliminated the need for steel internal supports within the areas enclosed by the aft fairing panels, but also permitted the use of aluminum honeycomb rather than steel for aft fairing panel construction. The deflector therefore provided a complete solution to the cracking and buckling problems without imposing a weight penalty on the aircraft.

The temperature control device of the present invention is intended for use in a jet aircraft engine installation that comprises a jet engine and a nacelle for supporting and enclosing the jet engine. The jet engine has a primary exhaust nozzle from which the jet engine produces a rearwardly extending primary exhaust plume of hot gases, the primary exhaust plume having a centerline and a generally cylindrical shape about such centerline. Each engine installation includes a nacelle-associated structure, such as a support strut for supporting the nacelle, that extends in a generally fore and aft direction above the centerline of the primary exhaust plume. The temperature control device comprises a deflector formed at the lowermost surface of the nacelle-associated structure. The deflector includes a sheet-like lower surface having a lateral extent greater than the lateral extent of the nacelle-associated structure immediately above the deflector, and extends longitudinally aft of the primary exhaust nozzle. The deflector is positioned such that its lower surface is generally parallel the primary exhaust plume.

DETAILED DESCRIPTION OF THE INVENTION

Figure 4:
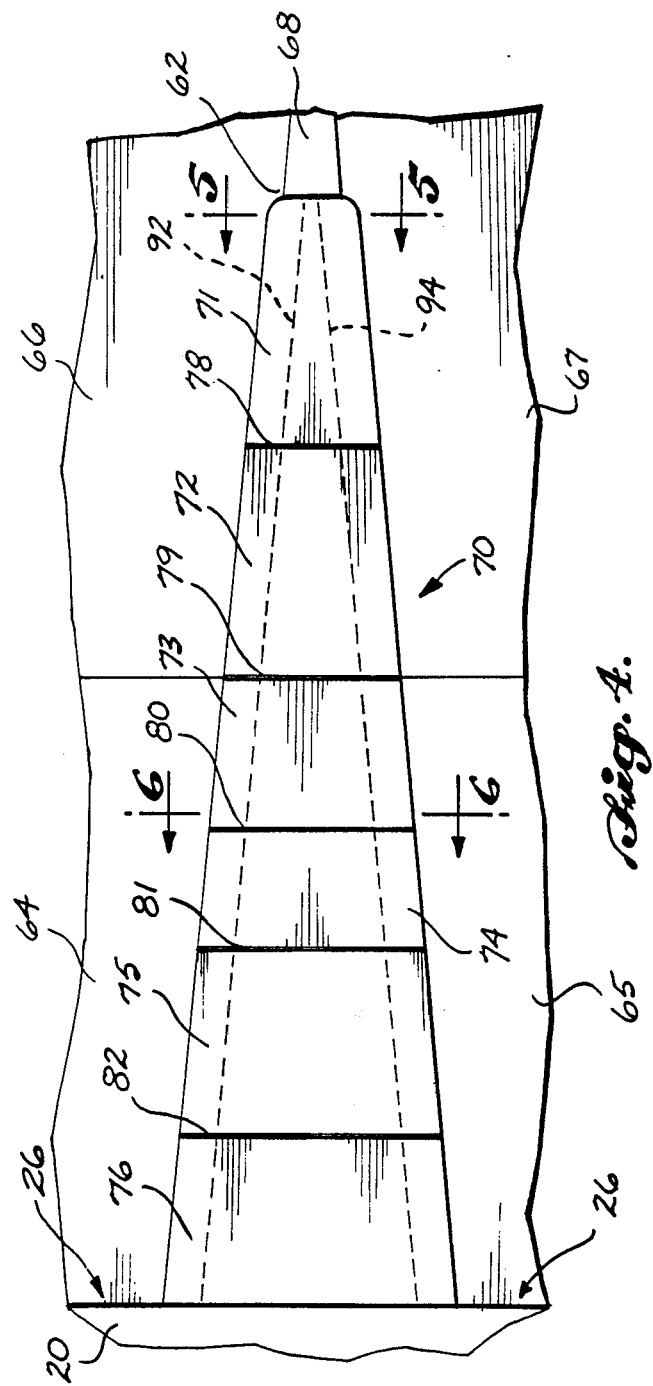
FIG. 4 is a bottom plan view showing the temperature control device of the present invention.
Figure 5:
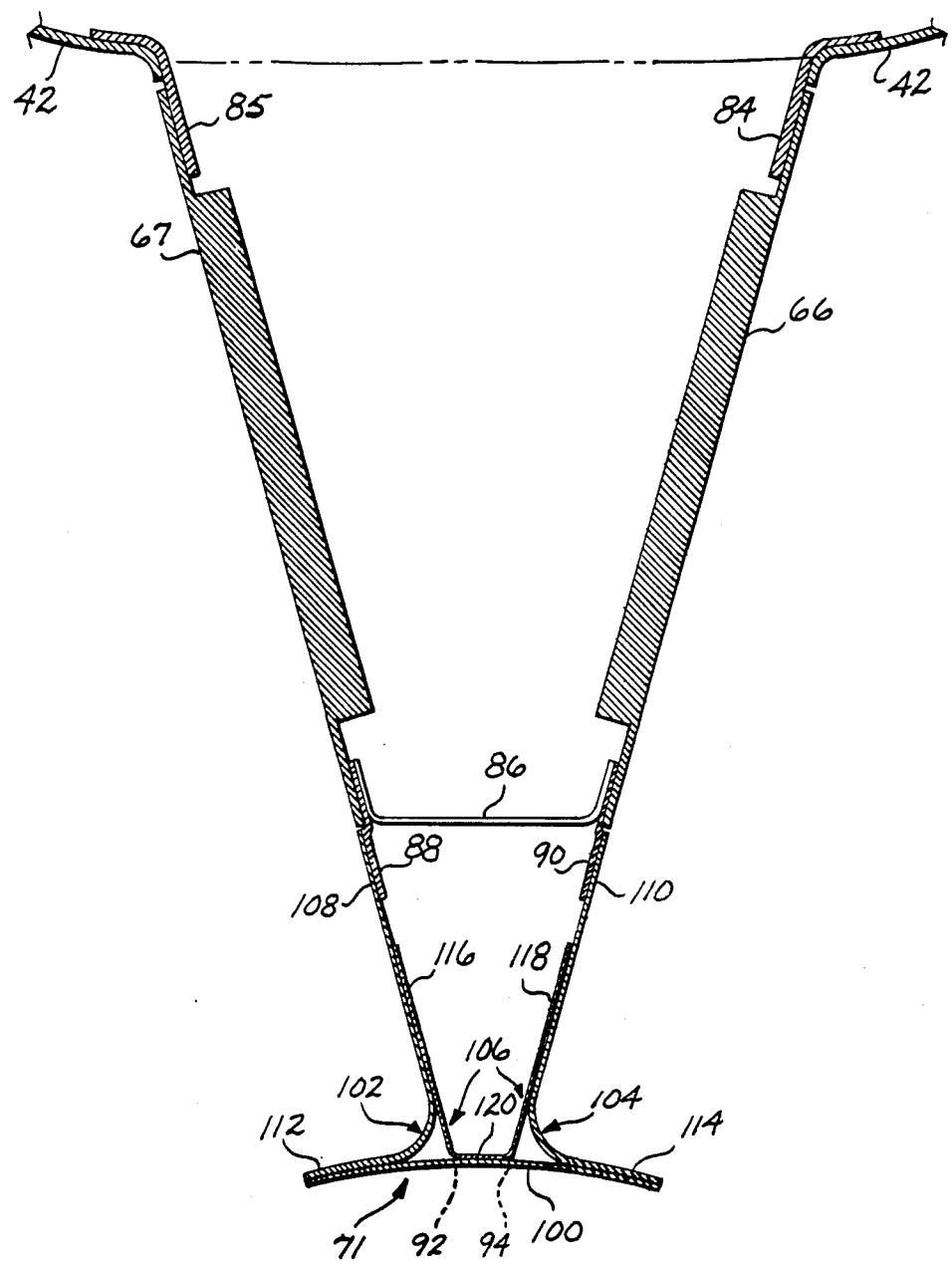
FIG. 5 is a cross-sectional view taken along line 5—5 of FIG. 4.
Figure 6:
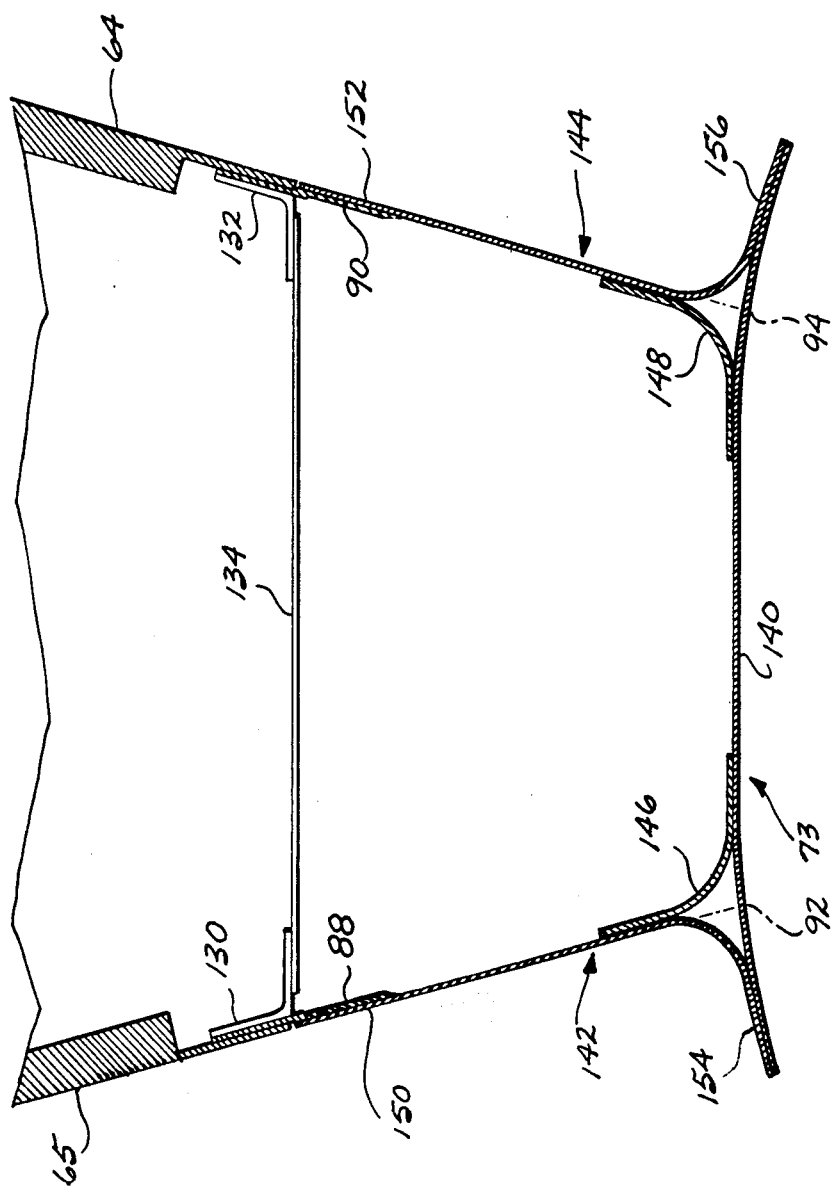
FIG. 6 is a cross-sectional view taken along line 6—6 of FIG. 4.

One preferred embodiment of the temperature control device of the present invention is illustrated in FIGS. 4–6. The temperature control device comprises shield assembly 70 that extends longitudinally beneath aft fairing panels 64–67 from primary exhaust nozzle 26 to break point 62. Aft fairing panels 64 and 65 are analogous to aft fairing panels 34 in FIG. 2, and aft fairing panels 66 and 67 are analogous to aft fairing panels 36 in FIG. 2. The aft fairing panels have been renumbered in FIG. 4 to reflect that they may now be fabricated from a different material, as described below. Break point 62 represents the point, also shown in FIG. 2, at which the lower pan assembly changes direction from a generally horizontal direction to an upwardly angled direction to meet aft wedge panel 38. As illustrated in FIG. 4, shield assembly 70 is divided lengthwise into six shield sections 71–76, the purpose of such division being to accommodate thermal expansion and contraction.

Figure 1:
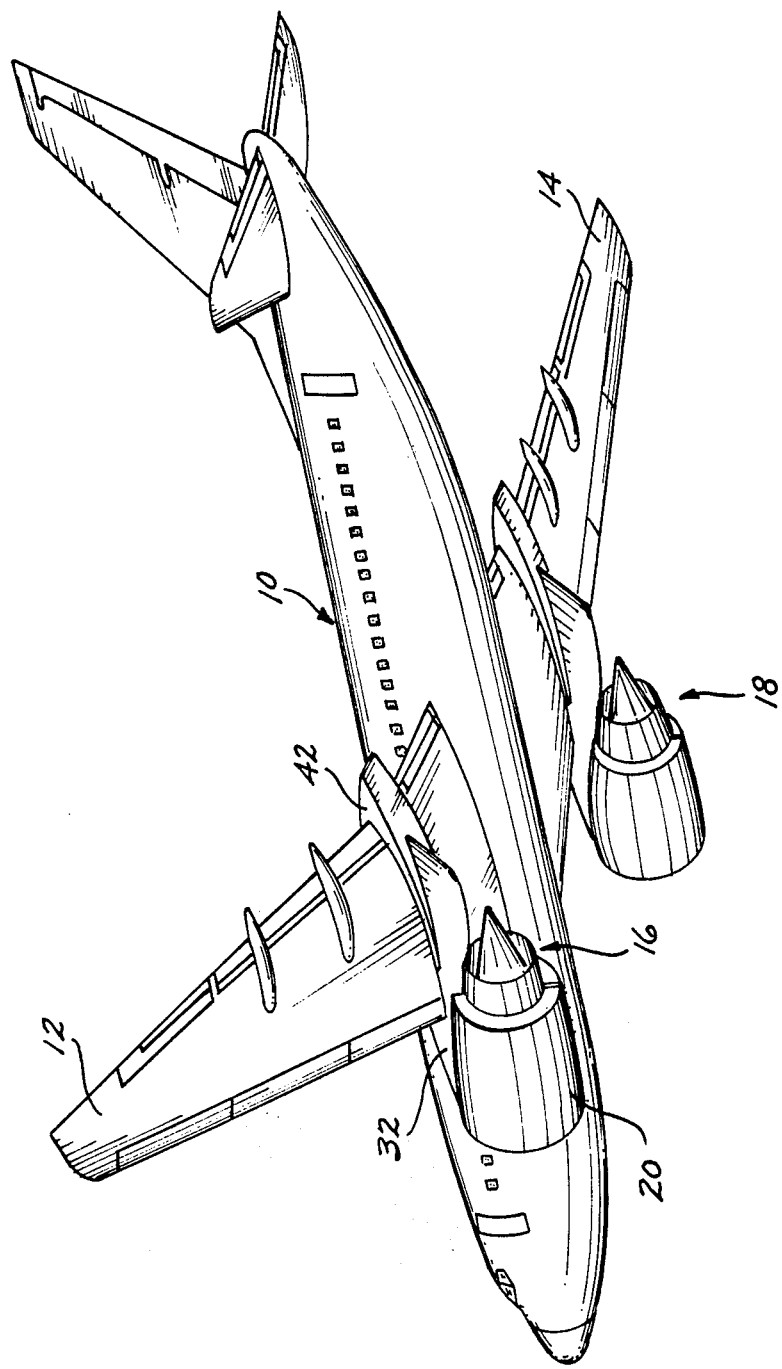
FIG. 1 is a perspective view of a twin engine jet aircraft.
Figure 2:
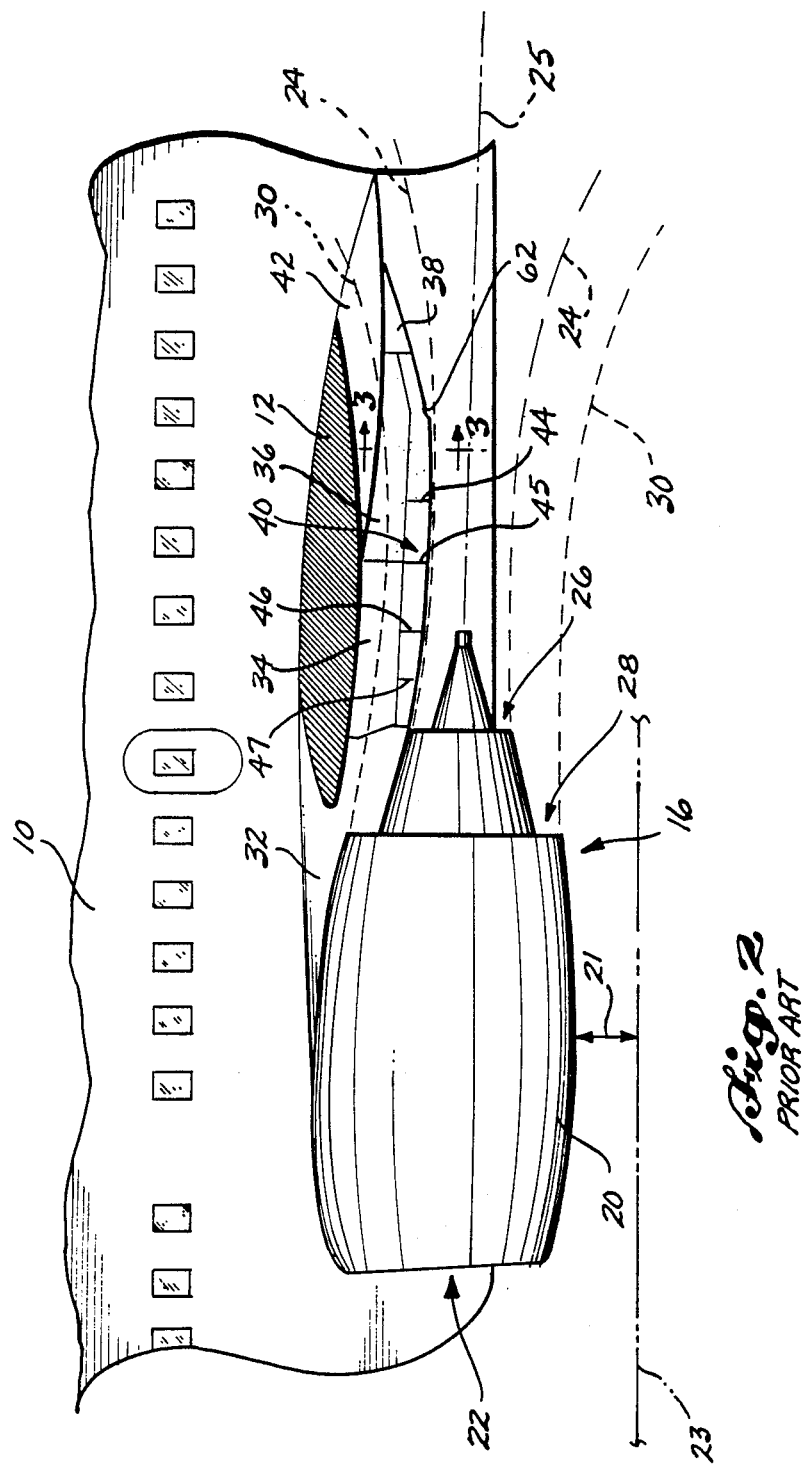
FIG. 2 is a side elevational view of one engine installation of the aircraft of FIG. 1.

Shield sections 71 and 72 are secured at the lower edges of aft fairing panels 66 and 67, and replace the corresponding portions of the lower pan assembly 40 in the prior art embodiment shown in FIG. 2. Shield sections 73–76 are secured to the lower edges of aft fairing panels 64 and 65, and also replace the corresponding portions of lower pan assembly 40. Shield assembly 70 does not extend rearwardly beyond break point 62, and the lower edges of aft fairing panels 66 and 67 beyond break point 62 therefore terminate in lower pan 68 that is in effect a remnant of lower pan assembly 40 of the embodiment of FIG. 2. Shield sections 71–76 are separated by gaps 78–82, to provide for a thermal expansion and extraction of the shield assembly. Gaps 78, 79, 81 and 82 correspond to gaps 44–47 in lower pan assembly 40 in the prior art embodiment of FIG. 2. Gap 80 is new, and does not correspond to any gap in the prior embodiment.

Figure 3:
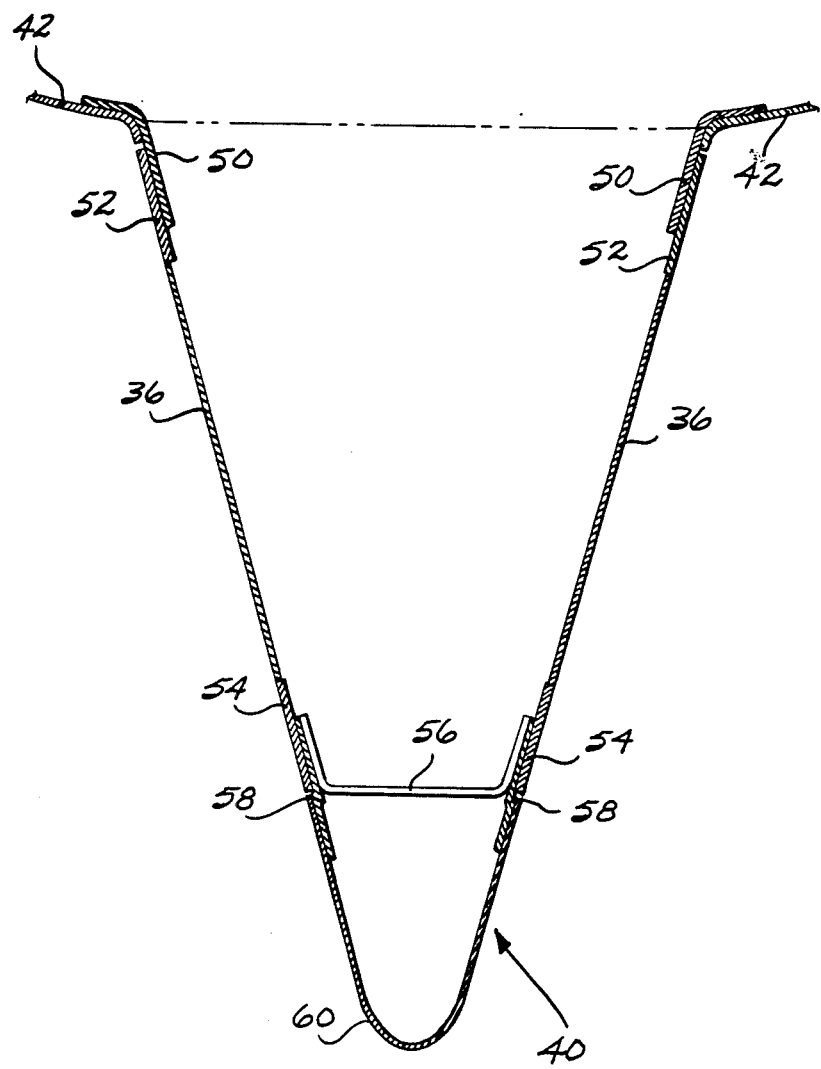
FIG. 3 is a cross-sectional view taken along line 3—3 of FIG. 2.

Referring now to FIG. 5, shield section 71 is fastened to and supported by aft fairing panels 66 and 67. In particular, aft fairing panels 66 and 67 are connected to flap track fairing 42 by skate angles 84 and 85, respectively. Unlike the embodiment of FIG. 3, aft fairing panels 66 and 67 are fabricated from aluminum honeycomb rather than steel. The lower ends of aft fairing panels 66 and 67 are joined by web 86. Secured between the aft fairing panels and web 86 are splice straps 88 and 90 that are used to support and mount shield segment 71.

Shield segment 71 comprises deflector 100, side supports 102 and 104 and center support 106. Deflector 100 has a slight curvature that approximates the curvature of the outer boundary of primary exhaust plume 24 shown in FIG. 2. Side supports 102 and 104 include respective upper portions 108 and 110 and respective lower portions 112 and 114. Upper portions 108 and 110 are secured to splice straps 88 and 90, respectively, and extend downward from the splice straps in a converging manner. Lower portions 112 and 114 extend in an outward direction away from one another, and support deflector 100 between them such that the lateral extent of the deflector is the same as the lateral extents of lower portions 112 and 114. Center support 106 is mounted within the area enclosed by the side supports and deflector, and includes upper arms 116 and 118 connected by lower web 120. Upper arms 116 and 118 are secured to the inner surfaces of upper portions 108 and 110 respectively, and lower web 120 is secured to the upper surface of deflector 100.

Points 92 and 94 on deflector 100 represent the points at which the deflector intersects the downward linear projections of aft fairing panels 66 and 67 and upper portions 108 and 110 respectively of side supports 102 and 104. The lateral extent of deflector 100 must be greater than the distance between points 92 and 94. In a preferred embodiment, the lateral extent of deflector 100 is greater than the distance between the lower edges of aft fairing panels 66 and 67. The positions of points 92 and 94 for the entire length of shield 70 are illustrated in FIG. 4. The distance between points 92 and 94 at any longitudinal position is the effective width of the nacelle-associated structure immediately above the deflector.

Deflector 100 is fabricated from Inconel 625 alloy and side supports 102 and 104 and center support 106 are fabricated from steel. However, the signficantly lower temperature produced above shield section 71, in comparison to the FIG. 3 embodiment, permits the use of aluminum honeycomb rather than steel for aft fairing panels 66 and 67. In addition, skate angles 84 and 85 and web 86 may now also be fabricated from aluminum, therefore providing an additional weight saving. In an actual test on a Boeing 737-300 aircraft cruising at 16,000 feet, temperature readings at the aft fairing panels were 500° F. without the temperature control device of the present invention, and 230° F. with the temperature control device in place.

Returning for the moment to FIG. 4, it will be recalled that shield 70 is divided lengthwise into six shield sections 71–76 by gaps 78–82. Each gap represents a small opening in the shield sections, e.g., in deflector 100, side supports 102 and 104 and center support 106 of shield segment 71, and the corresponding elements of the other shield segments. However splice straps 88 and 90 are not divided at gaps 78–82, but instead run the full length of shield assembly 70 and the aft fairing panels.

FIG. 6 shows a cross section through shield 70, and in particular through shield segment 73, at a point approximately halfway along the length of the shield, at the position indicated in FIG. 4. FIG. 6 illustrates aluminum honeycomb aft fairing panels 64 and 65 that are essentially identical to aft fairing panels 66 and 67 shown in FIG. 5. The lower ends of aft fairing panels 64 and 65 are joined by a web assembly coprising angle brackets 130 and 132 and plate 134 secured between the angle brackets. Splice strap 88 is secured between aft fairing panel 64 and angle bracket 130, and extends downward beneath angle bracket 130 and plate 134. Similarly, splice strap 90 is fastened between angle bracket 132 and aft fairing panel 64, and also extends downward in a generally converging manner with respect to splice strap 88.

Shield section 73 comprises deflector 140, side supports 142 and 144, and internal supports 146 and 148. Deflector 140 has a slightly curved shape, similar to the shape of deflector 100 shown in FIG. 5. However, the center section of deflector 140 may be essentially linear to simplify fabrication. Side supports 142 and 144 include respective upper portions 150 and 152 and respective lower portions 154 and 156. Upper portions 150 and 152 are secured to splice straps 88 and 90, respectively, and extend downward from the splice straps in a converging manner. Lower portions 154 and 156 extend in an outward direction away from one another, and support deflector 140 between them such that the lateral extent of the deflector is the same as the lateral extents of lower portions 154 and 156. Internal support 146 has a shape of a gradually angled bracket, and internally connects side support 142 to deflector 140. Internal support 148 similarly connects side support 144 to deflector 140. As with the structure shown in FIG. 5, deflector 140 is fabricated from Inconel 625 alloy, and side supports 142 and 144 and internal supports 146 and 148 are fabricated from steel.

While the preferred embodiments of the invention have been illustrated and described, it is to be understood that variations will be apparent to those skilled in the art. Accordingly, the invention is not to be limited to the specific embodiments illustrated and described, but is instead to be determined by reference to the following claims.

The embodiments of the invention in which an exclusive property or privilege is claimed are defined as follows:

1. A temperature control device for use in a jet aircraft engine installation, the engine installation comprising a jet engine having a primary exhaust nozzle from which the jet engine produces a rearwardly extending primary exhaust plume of hot gases, the primary exhaust plume having a centerline and a generally cylindrical shape about said centerline, the engine installation further comprising a nacelle for supporting and enclosing the jet engine, and a nacelle-associated structure that includes the temperature control device and that extends in a generally fore and aft direction above the centerline of the primary exhaust plume from a forward aerodynamically shaped leading edge to an aft trailing edge, the temperature control device comprising:

a deflector formed at the lowermost surface of the nacelle-associated structure, the deflector having a sheet-like lower surface having a lateral extent greater than the lateral extent of the nacelle-associated structure immediately above the deflector and aligned generally in parallel conformance therewith, the deflector extending longitudinally aft from the primary exhaust nozzle substantially to the trailing edge of the nacelle-associated structure and being positioned such that said lower surface is generally parallel to the primary exhaust plume.

2. The temperature control device of claim 1, wherein the nacelle-associated structure comprises first and second side members, each side member having upper and lower ends, the lower ends of the side members being mounted to the deflector.

3. The temperature control device of claim 2, wherein the side members extend downwardly in an initially converging manner, and thereafter angle away from one another such that their lower ends are diverging and nearly parallel to one another.

4. The temperature control device of claim 3, wherein the nacelle-associated structure further comprises a center support structure connecting the deflector to both of the side members at points intermediate the upper and lower ends.

5. The temperature control device of claim 1, wherein the deflector extends longitudinally in a rearward direction from a point adjacent the primary exhaust nozzle.

6. The temperature control device of claim 5, wherein the deflector is positioned with respect to the nacelle such that the primary exhaust plume is below and immediately adjacent to the deflector when the jet engine is operating under cruise conditions.

7. The temperature control device of claim 6, wherein the deflector has a slightly concave, downward opening shape having a radius of curvature approximately equal to the radius of curvature of the primary exhaust plume under cruise conditions.

* * * * *